(12) United States Patent
Garcia Azorero et al.

(10) Patent No.: US 11,843,999 B2
(45) Date of Patent: Dec. 12, 2023

(54) METHODS, APPARATUS AND MACHINE-READABLE MEDIUMS RELATING TO CHARGING IN A COMMUNICATION NETWORK

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Robert Törnkvist, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 391 days.

(21) Appl. No.: 17/426,027

(22) PCT Filed: Mar. 5, 2019

(86) PCT No.: PCT/EP2019/055434
§ 371 (c)(1),
(2) Date: Jul. 27, 2021

(87) PCT Pub. No.: WO2020/156685
PCT Pub. Date: Aug. 6, 2020

(65) Prior Publication Data
US 2021/0368306 A1    Nov. 25, 2021

(51) Int. Cl.
*H04W 4/24* (2018.01)
*H04M 15/00* (2006.01)
*H04W 8/20* (2009.01)

(52) U.S. Cl.
CPC ............. *H04W 4/24* (2013.01); *H04M 15/64* (2013.01); *H04M 15/65* (2013.01); *H04M 15/88* (2013.01); *H04W 8/20* (2013.01)

(58) Field of Classification Search
CPC ........ H04W 4/24; H04W 60/00; H04W 60/64
See application file for complete search history.

(56) References Cited

U.S. PATENT DOCUMENTS

| 10,609,667 B1 * | 3/2020 | Cakulev | H04W 60/06 |
| 2013/0058260 A1 * | 3/2013 | Dahl | H04M 15/65 370/259 |

(Continued)

FOREIGN PATENT DOCUMENTS

WO    WO-2014191027 A1 *  12/2014  ......... H04L 12/1403

OTHER PUBLICATIONS

International Search Report and Written Opinion dated Oct. 9, 2019 for International Application No. PCT/EP2019/055434 filed Mar. 5, 2019, consisting of 14 pages.

(Continued)

*Primary Examiner* — Kevin Kim
(74) *Attorney, Agent, or Firm* — Christopher & Weisberg, P.A.

(57) ABSTRACT

One aspect provides a method performed by a network node implementing a network function repository function in a core network. A registration request message to register a CHF in a repository of network functions is received, the registration request message includes an indication of one or more sets of charging characteristics supported by the CHF and addressing information to reach the CHF. Each CHF in the repository is registered. A discovery request message including one or more search parameters for identifying a CHF, including at least an indication of a set of charging characteristics to be applied for the packet data connection is received. A CHF that supports the indicated set of charging characteristics is identified based on the one or more (Continued)

search parameters. A discovery response message comprising the addressing information to reach the identified CHF is transmitted.

24 Claims, 6 Drawing Sheets

(56) References Cited

U.S. PATENT DOCUMENTS

2019/0238425 A1* 8/2019 Mladin .................. H04L 41/342
2019/0379544 A1* 12/2019 Suthar .................... H04L 63/08

OTHER PUBLICATIONS

3GPP TS 32.251 V13.4.0; 3rd Generation Partnership Project; Technical Specification Group Services and System Aspects; Telecommunication management; Charging management; Packet Switched (PS) domain charging (Release 13); Mar. 2016; consisting of 180 pages.
3GPP TS 23.203 V15.4.0; 3rd Generation Partnership Project; Technical Specification Group Services and System Aspects; Policy and charging control architecture (Release 15); Sep. 2018; consisting of 262 pages.
3GPP TS 29.219 V15.1.0; 3rd Generation Partnership Project; Technical Specification Group Core Network and Terminals; Policy and Charging Control: Spending Limit Reporting over Sy reference point (Release 15); Mar. 2018; consisting of 23 pages.
3GPP TS 32.290 V15.1.0; 3rd Generation Partnership Project; Technical Specification Group Services and System Aspects; Telecommunication management; Charging management; 5G system; Services, operations and procedures of charging using Service Based Interface (SBI) (Release 15); Sep. 2018; consisting of 25 pages.
3GPP TS 32.291 V15.0.0; 3rd Generation Partnership Project; Technical Specification Group Services and System Aspects; Telecommunication management; Charging management; 5G system, charging service; Stage 3; (Release 15); Sep. 2018, consisting of 59 pages.
3GPP TS 32.255 V15.0.0; 3rd Generation Partnership Project; Technical Specification Group Services and System Aspects; Telecommunication management; Charging management; 5G data connectivity domain charging; stage 2 (Release 15); Sep. 2018; consisting of 72 pages.
3GPP TS 32.255 V15.1.0; 3rd Generation Partnership Project; Technical Specification Group Services and System Aspects; Telecommunication management; Charging management; 5G data connectivity domain charging; Stage 2; (Release 15); Dec. 2018; consisting of 67 pages.
3GPP TS 23.501 V16.0.0+; 3rd Generation Partnership Project; Technical Specification Group Services and System Aspects; System Architecture for the 5G System; Stage 2 (Release 16); Feb. 2019; consisting of 281 pages.
3GPP TS 23.502 V15.3.0; 3rd Generation Partnership Project; Technical Specification Group Services and System Aspects; Procedures for the 5G System; Stage 2 (Release 15); Sep. 2018; consisting of 330 pages.
3GPP TS 29.510 V15.1.0; 3rd Generation Partnership Project; Technical Specification Group Core Network and Terminals; 5G System; Network Function Repository Services; Stage 3 (Release 15); Sep. 2018; consisting of 84 pages.
3GPP TS 29.594 V15.1.0; 3rd Generation Partnership Project; Technical Specification Group Core Network and Terminals; 5G System; Spending Limit Control Service; Stage 3 (Release 15); Sep. 2018; consisting of 29 pages.
3GPP TSG-CT Meeting #82 CP-183153 was C4-188621 was C4-188473, C4-188152; Title: CHF discovery based on GPSI and SUPI; Source to WG: Huawei; Source to TSG: Huawei; Work item code: 5GS_Ph1-CT; Date and Location: Dec. 10-11, 2018, Sorrento, Italy, consisting of 8 pages.
3GPP TS 29.512 V15.1.0; 3rd Generation Partnership Project; Technical Specification Group Core Network and Terminals; 5G System; Session Management Policy Control Service; Stage 3 (Release 15); Sep. 2018; consisting of 112 pages.
3GPP TS 23.502 V15.4.1; 3rd Generation Partnership Project; Technical Specification Group Services and System Aspects; Procedures for the 5G System; Stage 2 (Release 15); Jan. 2019; consisting of 347 pages.
3GPP TS 32.251 V15.3.0; 3rd Generation Partnership Project; Technical Specification Group Services and System Aspects; Telecommunication management; Charging management; Packet Switched (PS) domain charging (Release 15); Jun. 2018; consisting of 187 pages.
3GPP TS 23.501 V15.3.0; 3rd Generation Partnership Project; Technical Specification Group Services and System Aspects; System Architecture for the 5G System; Stage 2 (Release 15); Sep. 2018; consisting of 226 pages.
3GPP TS 29512 V15.2.0; 3rd Generation Partnership Project; Technical Specification Group Core Network and Terminals; 5G System; Session Management Policy Control Service; Stage 3 (Release 15); Dec. 2018; consisting of 132 pages.

* cited by examiner

METHODS, APPARATUS AND MACHINE-READABLE MEDIUMS RELATING TO CHARGING IN A COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2019/055434, filed Mar. 5, 2019 entitled "METHODS, APPARATUS AND MACHINE-READABLE MEDIUMS RELATING TO CHARGING IN A COMMUNICATION NETWORK," which claims priority to European Patent Application No.: EP19382071.9 filed Feb. 1, 2019, the entireties of both of which are incorporated herein by reference.

TECHNICAL FIELD

Embodiments of the disclosure relate to methods, apparatus and machine-readable mediums for charging in a communication network.

BACKGROUND

Wireless communication networks are utilized by network operators to provide connectivity and services to their subscribers. Network operators are commercial entities, and thus it is important to put in place mechanisms which allow for the network usage by those subscribers to be effectively controlled and charged for.

The Third Generation Partnership Project (3GPP) specifies both offline and online charging mechanisms to properly charge for User Equipment (UE) activities. In offline charging (implemented by an offline charging system (OFCS)), the resource usage is reported from the network to the Billing Domain after the resource usage has occurred; in online charging (implemented by an online charging system (OCS)), a subscriber account (located in an online charging system) is queried prior to granting permission to use the requested network resource(s).

In Evolved Packet Core (EPC) networks, the Home Subscriber Server (HSS) keeps the charging characteristics related to a UE as part of the subscriber profile. These charging characteristics provide information related to a specific charging behaviour which is defined on a per operator basis (see 3GPP TS 32.251, v 15.3.0). Possible information included here includes the Online and Offline charging addresses, time limit, volume limit, time specific tariff, etc. Charging characteristics are sent to the Mobility Management Entity (MME)/Serving GPRS Support Node (SGSN) as part of the user registration, and distributed to the Packet Data Network Gateway (PGW)/Policy and Charging Rules Function (PCRF)/Traffic Detection Function (TDF) as part of the establishment of a Packet Data Network (PDN) connection.

In addition to this static charging information, 3GPP also defines a Policy and Charging Control framework (see 3GPP TS 23.203, v 15.4.0) that allows application of a specific charging behaviour based on policy conditions.

As part of this framework, when the UE establishes a PDN connection, the PCRF provides charging related information that allows the Policy and Charging Enforcement Function (PCEF)/TDF to apply the mechanisms so that the UE is properly charged. As part of this information, the PCRF may provide:
  Primary and secondary online and/or offline charging addresses
  A default charging method (online or offline) that applies when not provided as part of the PCC Rule
  An access charging address identifier
  If the PCRF does not provide any online/offline charging address or does not provide any default charging method, the PCEF/TDF will use HSS-provided information or preconfigured values. PCRF provided values will override any other value.

Once the PCEF/TDF gets this information it will initiate a Gy/Gyn or Gz/Gzn session for credit management and charging purposes.

Additionally, the PCRF may also apply policy decisions based on spending limits. In order to do so, the PCRF will initiate a Sy session towards the OCS (see 3GPP TS 29.219, v 15.1.0) to get information about the counter status related to certain traffic. Based on this information, the PCRF can apply and/or modify specific policies related to that traffic. The OCS address is configured in the PCRF.

3GPP is currently specifying and developing so-called 5th Generation (5G) standards. 5G charging-related services, operations and procedures using a service-based interface are specified in 3GPP TS 32.290, v 15.1.0. Details of the charging protocol are specified in 3GPP TS 32.291, v 15.0.0. Charging management is specified in 3GPP TS 32.255, v 15.0.0.

One of the main differences with the charging architecture in EPC is that the defined charging function (CHF) in 5G is a converged function that handles both online and offline charging. The Session Management Function (SMF) shall then support converged online and offline charging.

Following the same approach as in EPC, the Charging Characteristics are used to identify the charging behaviour in the SMF. Charging Characteristics are identified by a behaviour index, and include a list of information that is required to properly charge the subscriber. For example, the following table sets out Charging Characteristics as specified in Table A.1 of 3GPP TS 32.255, v 15.1.0:

| | | | Converged charging | | | | | |
|---|---|---|---|---|---|---|---|---|
| Behaviour index | Default charging method | Primary and Secondary CHF addresses | Active | Time Limit Per PDU session | Vol. Limit Per PDU session | Change Cond. Per PDU session | Tariff times | |
| 0 | Online | URI 1 URI 2 | Yes | 10 min | 1 Mb | 2 | 0-7, 7-12 | ... |
| 1 | Offline | URI 1 URI 2 | Yes | 15 min | 5 Mb | 3 | 0-24 | ... |
| 2 | Online | URI 1 | Yes | 30 min | 2 Mb | 2 | 0-7, | ... |

-continued

| | | | | Converged charging | | | | |
|---|---|---|---|---|---|---|---|---|
| Behaviour index | Default charging method | Primary and Secondary CHF addresses | Active | Time Limit Per PDU session | Vol. Limit Per PDU session | Change Cond. Per PDU session | Tariff times | |
| 3 | Offline | URI 2 URI 1 URI 2 | No | — | — | — | 7-12 — | ... |
| ... | ... | ... | ... | ... | ... | ... | ... | ... |

The Charging Characteristics information is stored as part of the subscription data in the Unified Data Management (UDM). The default charging method (i.e., online or offline) and the primary and secondary CHF addresses (e.g., uniform resource identifiers (URIs)) are part of the Charging Characteristics. The Policy Control Function (PCF) may provide the SMF with the default charging method and primary and secondary CHF addresses (URI) that will overwrite any possible value received from the UDM as part of the Charging Characteristics. See clause 4.2.2.3 of 3GPP TS 29.512, v 15.1.0 for further details.

Spending Limit Control Service is also defined in 5G in a similar way as in EPC. Details of this approach are described in 3GPP TS 29.594, v 15.1.0.

3GPP TS 23.502 v 15.4.1 has defined a Service Based Architecture (SBA) for 5G networks, wherein different services can be offered by different Network Functions (NFs). An NF offering a service registers in an NF Repository Function (NRF) and each NF consumer that requires a service communicates with the NRF to discover the NF provider that offers that service.

CHF selection in 5G is described in subclause 5.1.8 in 3GPP TS 32.255, v 15.1.0. It follows the same approach as in EPC and makes use of the CHF addresses (e.g., URIs) included in the Charging Characteristics received from the UDM. In addition, when the Charging Characteristics do not identify any CHF address, the SMF (or other NF Consumer of CHF services, such as the policy control function, for example) may make use of the NRF services as specified in 3GPP TS 32.290, v 15.1.0. This specification describes that CHF registration and discovery services in the NRF can use range(s) of 5G Subscription Permanent Identifier (SUPI), range(s) of General Public Subscription Identifier (GPSI) and/or range(s) of Public Land Mobile Networks (PLMNs) to differentiate between different CHF instances.

Thus, the CHF addresses are configured as part of the Charging Characteristics in 5G. However, this mechanism, with its static nature (CHF addresses are statically configured), does not follow the principles of a Service Based Architecture preferred for 5G core network functions, and moreover requires a tight coordination between entities to avoid misalignments. Essentially, the role of the NRF is made irrelevant if the Charging Characteristics include one or more CHF addresses.

Further, when the Charging Characteristics includes no CHF address (and different CHFs are thus selected by subscriber ranges such as SUPIs, GPSIs, PLMNs), it is not possible to differentiate between CHFs based on charging capabilities.

SUMMARY

Embodiments of the disclosure seek to address these and other problems.

In one aspect, there is provided a method performed by a network node implementing a network function repository function in a core network. The network function repository function has access to a repository of network functions. The method comprises: receiving, from each charging function, CHF, amongst a plurality of CHFs, a registration request message to register the CHF in the repository of network functions, the registration request message comprising an indication of one or more sets of charging characteristics supported by the CHF and addressing information to reach the CHF; registering each CHF in the repository of network functions, the registration associating the indication of one or more sets of charging characteristics supported by the CHF with the addressing information to reach the CHF; receiving, from a requesting network node, a discovery request message comprising one or more search parameters for identifying a CHF to be used for a packet data connection for a user equipment, the one or more search parameters including at least an indication of a set of charging characteristics to be applied for the packet data connection; identifying, from the repository of network functions and based on the one or more search parameters, a CHF that supports the indicated set of charging characteristics; and transmitting, to the requesting network node, a discovery response message comprising the addressing information to reach the identified CHF.

Apparatus for performing the method outlined above and described in more detail below is also provided. For example, one aspect provides a network node implementing a network function repository function, configured to perform the method. Another aspect provides a network node implementing a network function repository function in a core network. The network function repository function has access to a repository of network functions. The network node comprises processing circuitry and a non-transitory machine-readable medium storing instructions which, when executed by the processing circuitry, cause the network node to: receive, from each charging function, CHF, amongst a plurality of CHFs, a registration request message to register the CHF in the repository of network functions, the registration request message comprising an indication of one or more sets of charging characteristics supported by the CHF and addressing information to reach the CHF; register each CHF in the repository of network functions, the registration associating the indication of one or more sets of charging characteristics supported by the CHF with the addressing information to reach the CHF; receive, from a requesting network node, a discovery request message comprising one or more search parameters for identifying a CHF to be used for a packet data connection for a user equipment, the one or more search parameters including at least an indication of a set of charging characteristics to be applied for the packet data connection; identify, from the repository of network functions and based on the one or more search parameters, a CHF that supports the indicated set of charging characteristics; and transmit, to the requesting network node, a discovery response message comprising the addressing information to reach the identified CHF.

A further aspect provides a non-transitory machine-readable medium storing instructions which, when executed by processing circuitry of a network node implementing a network function repository function in a core network, the network function repository function having access to a repository of network functions, cause the network node to: receive, from each charging function, CHF, amongst a plurality of CHFs, a registration request message to register the CHF in the repository of network functions, the registration request message comprising an indication of one or more sets of charging characteristics supported by the CHF and addressing information to reach the CHF; register each CHF in the repository of network functions, the registration associating the indication of one or more sets of charging characteristics supported by the CHF with the addressing information to reach the CHF; receive, from a requesting network node, a discovery request message comprising one or more search parameters for identifying a CHF to be used for a packet data connection for a user equipment, the one or more search parameters including at least an indication of a set of charging characteristics to be applied for the packet data connection; identify, from the repository of network functions and based on the one or more search parameters, a CHF that supports the indicated set of charging characteristics; and transmit, to the requesting network node, a discovery response message comprising the addressing information to reach the identified CHF.

A further aspect of the disclosure provides a method performed by a network node implementing a network function in a core network. The method comprises: upon a user equipment, UE, establishing a packet data connection in the core network, retrieving, from a subscription network node, subscription data for the UE including an indication of a set of charging characteristics to be used for the packet data connection for the UE; transmitting, to a network node implementing a network function repository function, a discovery request message comprising one or more search parameters for identifying a charging function, CHF, the one or more search parameters including at least an indication of the set of charging characteristics to be applied for the packet data connection; receiving, from the network node implementing the network function repository function, a discovery response message comprising addressing information to reach the identified CHF; and utilizing the addressing information to reach the identified CHF for the packet data connection for the UE.

Apparatus for performing the method outlined above and described in more detail below is also provided. For example, one aspect provides a network node implementing a network function, configured to perform the method. Another aspect provides a network node implementing a network function in a core network. The network node comprises processing circuitry and a non-transitory machine-readable medium storing instructions which, when executed by the processing circuitry, cause the network node to: upon a user equipment, UE, establishing a packet data connection in the core network, retrieve, from a subscription network node, subscription data for the UE including an indication of a set of charging characteristics to be applied for the packet data connection for the UE; transmit, to a network node implementing a network function repository function, a discovery request message comprising one or more search parameters for identifying a charging function, CHF, the one or more search parameters including at least an indication of the set of charging characteristics to be applied for the packet data connection; receive, from the network node implementing the network function repository function, a discovery response message comprising addressing information to reach the identified CHF; and utilize the addressing information to reach the identified CHF for the packet data connection for the UE.

A further aspect provides a non-transitory machine-readable medium storing instructions which, when executed by processing circuitry of a network node implementing a network function in a core network, cause the network node to: upon a user equipment, UE, establishing a packet data connection in the core network, retrieve, from a subscription network node, subscription data for the UE including an indication of a set of charging characteristics to be used for the packet data connection for the UE; transmit, to a network node implementing a network function repository function, a discovery request message comprising one or more search parameters for identifying a charging function, CHF, the one or more search parameters including at least an indication of the set of charging characteristics to be applied for the packet data connection; receive, from the network node implementing the network function repository function, a discovery response message comprising addressing information to reach the identified CHF; and utilize the addressing information to reach the identified CHF for the packet data connection for the UE.

BRIEF DESCRIPTION OF THE DRAWINGS

For a better understanding of embodiments of the present disclosure, and to show more clearly how they may be carried into effect, reference will now be made, by way of example only, to the following drawings, in which.

DETAILED DESCRIPTION

Figure 1:
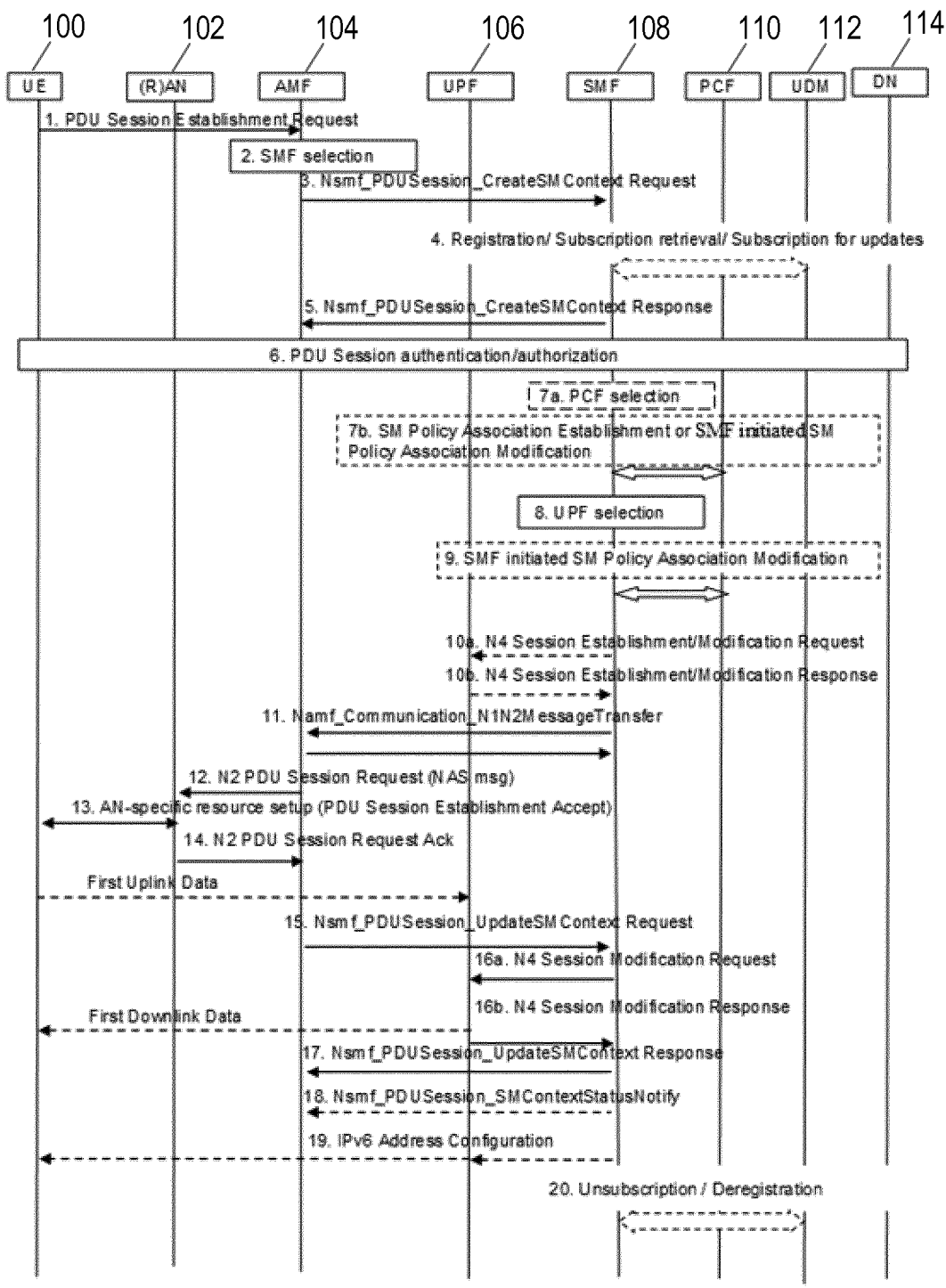
FIG. 1 shows the attach procedure in a wireless network.

FIG. 1 is a flow diagram showing a procedure for attaching a UE in a wireless network, in the illustrated embodiment particularly establishment of a UE-requested protocol data unit (PDU) session in a 5G network. Those skilled in the art will appreciate that a similar procedure is in place for establishment of a PDU session when the UE is roaming (i.e., attached to a network which is remote from its home network).

Figure 4:
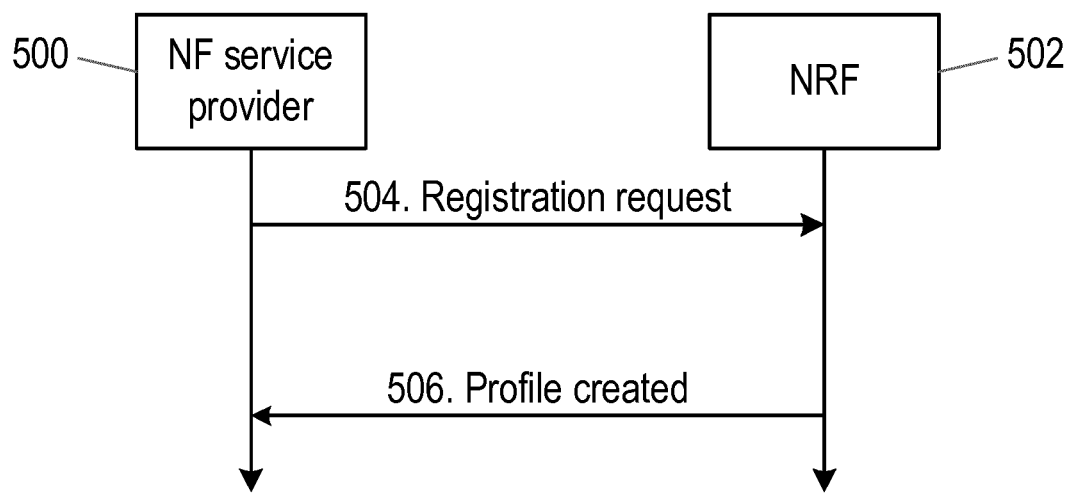
FIG. 4 is a signalling diagram showing a process of network function registration according to embodiments of the disclosure.

The procedure is based on that described in FIG. 4.3.2.2.1-1 of 3GPP TS 23.502, version 15.4.1. The procedure may be invoked in various circumstances, such as upon the UE initiating a new PDU session, upon the UE initiating handover of an existing PDU session from a non-3GPP network or a non-5G network to the 5G network, or upon the network initiating establishment of the PDU session for some reason (e.g. instructing the UE to request establishment of the PDU session).

The entities shown in FIG. 1 are the UE 100, an access network 102 (which may be a radio access network (RAN)), an access and mobility management function (AMF) 104, a user plane function (UPF) 106, a session management function (SMF) 108, a policy control function (PCF) 110, a user data management function (UDM) 112 and a data network (DN) 114.

A full description of the process of attaching the UE to the network is beyond the scope of this disclosure. Only those steps which are relevant to the selection of a charging function (CHF) are described herein. In step 1, the UE 100 transmits, via the AN 102, a request message to establish a PDU session (PDU Session Establishment Request) to the AMF 104. In step 2, the AMF selects an SMF 108. This selection may correspond to an SMF specified in the request message received in step 1, or alternatively the AMF 104 may follow a predefined process to select an SMF 108 (e.g., as set out in clause 6.3.2, 3GPP TS 23.501 v15.4.0). In step 3 the AMF 104 transmits a request message to establish a PDU session for the UE 100 to the selected SMF 108.

In step 4, the SMF 108 retrieves subscription information for the UE 100 from the UDM 112. The UDM 112 may in turn acquire this information from a unified data repository (UDR) function (see FIG. 2 below). The subscription information comprises a plurality of parameters required for PDU session establishment, including a parameter known as the charging characteristics.

As described above, the charging characteristics provide information related to a specific charging behaviour. The charging characteristics may specify a number of charging parameters, including one or more of: a default charging method (e.g., online or offline); whether or not charging data records (CDRs) may be activated; a time limit per PDU session; a volume limit per PDU session; a change condition per PDU session (e.g., a condition which is to be monitored before reporting to the CHF); a tariff time, or range of tariff times (e.g., the period of time for which the charging will apply). Each set of charging characteristics may be associated with an index known as a behaviour index.

In conventional methods, as described above with reference to Table A.1 of 3GPP TS 32.255, v15.1.0, the charging characteristics additionally include addresses of primary and secondary CHFs to be used for charging during the PDU session. The secondary CHF is specified in case the primary CHF is unavailable.

However, this mechanism, with its static nature, does not follow the principles of a Service Based Architecture preferred for 5G core network functions, and moreover requires a tight coordination between entities to avoid misalignment.

According to embodiments of the disclosure, the charging characteristics omit addressing information for any CHFs (whether primary or secondary CHFs). Rather, a CHF is found by communicating with the network function repository function (NRF), and based on the charging characteristics itself.

Each CHF may indicate upon registering with the NRF the one or more charging behaviours that it can support. In one embodiment, this indication comprises one or more behaviour indexes (i.e., indexes referring to respective sets of charging characteristics). In another embodiment, the indication comprises a new identifier associated with one or more charging behaviours (e.g., sets of charging characteristics). The new identifier may be known herein as a charging profile identifier (or charging profile ID).

The table below shows multiple sets of charging characteristics according to this latter embodiment:

| Behaviour index | Default charging method | Active | Time Limit Per PDU session | Vol Limit Per PDU session | Change Cond. Per PDU session | Tariff times | ... | Charging Profile ID |
|---|---|---|---|---|---|---|---|---|
| 0 | Online | Yes | 10 min | 1 Mb | 2 | 0-7, 7-12 | ... | CharProfId 1 |
| 1 | Offline | Yes | 15 min | 5 Mb | 3 | 0-24 | ... | CharProfId 2 |
| 2 | Online | Yes | 30 min | 2 Mb | 2 | 0-7, 7-12 | ... | ChargProfId 1 |
| 3 | Offline | No | — | — | — | — | ... | ChargProfId 3 |
| ... | ... | ... | ... | ... | ... | ... | ... | ... |

It can be seen that each set of charging characteristics omits any addressing information for CHFs. It can further be seen that, in the illustrated embodiment, each set of charging characteristics comprises an indication of a charging profile identifier.

Each charging profile ID may be associated with one or more sets of charging characteristics. Thus, for example, CharProfId 1 is associated with multiple sets of charging characteristics (identified by behaviour indexes 0 and 2), while CharProfId 2 and CharProfId 3 are associated with one set of charging characteristics each (identified by behaviour indexes 1 and 3 respectively).

The charging profile ID is further associated with one or more CHFs (for example, as specified by a network operator). For example, in one embodiment, each charging profile ID may be associated with one primary CHF and one secondary CHF. If both online and offline charging apply, both online and offline CHF addresses may be defined. A network operator may allocate CHFs to each charging profile ID based on criteria such as the home PLMN, selected core network slices, location, etc.

Note that the charging profile identifier may be omitted in embodiments of the disclosure which rely on the behaviour indexes directly to identify those charging behaviours which are supported by CHFs.

The one or more charging behaviours supported by the CHF are then associated with the CHF in the NRF. As part of the procedure for attaching the UE to the wireless network, a CHF for the connection may be found by determining the desired charging behaviour or the charging profile identifier for the connection, and querying the NRF for one or more CHFs which can support that charging behaviour, or which are associated with that charging profile identifier. The NRF may then search for one or more suitable CHFs, and return addressing information for those one or more CHFs to be utilized for the packet data connection.

Thus, in step 4, the SMF 108 retrieves an indication of the set of charging characteristics for the UE from the UDM 112. According to embodiments of the disclosure, this set of charging characteristics does not include any addressing information for a CHF. The set of charging characteristics may be associated with a behaviour index. The set of charging characteristics may additionally be associated with or comprise a charging profile identifier as defined above.

In step 5, the SMF 108 transmits a response message to the AMF 104. For example, the SMF 108 may create a session management context and transmit a session management context identifier in the response message.

Optionally, in step 6, a secondary authentication/authorization is triggered, e.g., as defined in clause 4.3.2.3 of 3GPP TS 23.501, by the SMF 108. This step may not be necessary if the request message in step 3 indicates that the request relates to an existing PDU session or an emergency request, for example.

In step 7a, the SMF 108 selects a PCF 110 and, in step 7b, the SMF 108 communicates with the selected PCF 110 to establish a session management policy association. The establishment of a session management policy association involves the selection of a charging function CHF (not illustrated) for the PDU session.

When the SMF 108 is contacted for the establishment of a new PDU session and once the indication of the set of charging characteristics is received in step 4, the SMF 108 extracts an indication of the set of charging characteristics (which may be a behaviour index or a Charging Profile ID, for example) and provides it to the PCF 110 to create a session management policy control (Npcf_SMPolicyControl_create service operation). The PCF 110 checks the received indication of the set of charging characteristics and, based on subscription information and dynamic information, determines whether this set of charging characteristics is acceptable or a different one needs to be provided back. The selected set of charging characteristics is indicated in a reply to the SMF 108.

The SMF 108 or the PCF 110 may subsequently use the selected set of characteristics to discover a suitable CHF, in communication with the NRF. Thus, the SMF 108 or the PCF 110 may query the NRF for one or more CHFs which can support that set of charging characteristics, or which are associated with that charging profile identifier. The NRF may then search for one or more suitable CHFs, and return addressing information for those one or more CHFs to be utilized for the packet data connection.

In this way, the charging domain is integrated into the communication network in a flexible way, via the Service Based Architecture. This allows the operator to benefit from the flexibility of having different CHF addresses depending on the specific particularities of the UE and PDN connection. The current configuration aspects are simplified, allowing a more flexible charging solution.

Embodiments of the disclosure are set out in more detail below.

Figure 2:
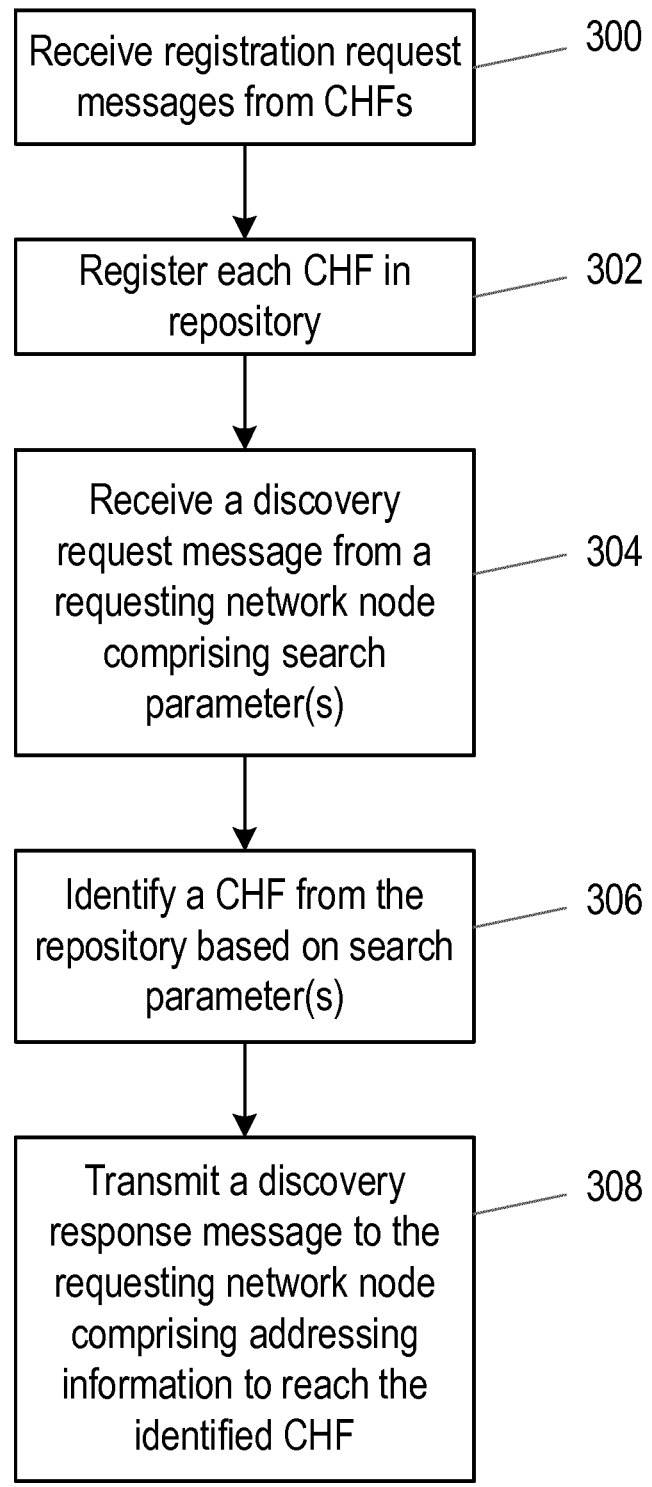
FIG. 2 is a flowchart of a method in a network node implementing a network function repository function according to embodiments of the disclosure.

FIG. 2 is a flowchart of a method in a network node implementing a network function repository function (NRF) according to embodiments of the disclosure. Part of the method may be employed in step 7b, described above with respect to FIG. 1.

In step 300, the NRF receives registration request messages from a plurality of charging functions (CHFs) and, in step 302, registers each of the CHFs in the repository. This aspect is shown in more detail in FIG. 4, which is a signalling diagram showing a process of network function registration according to embodiments of the disclosure.

3GPP has defined a Service Based Architecture (SBA) for 5G networks. In this architecture, different services can be offered by different Network Functions (NFs). In order to apply certain functionality, the NF consumer has to discover the NF that offers the required service. In order to do so, NFs that offer a service should be registered in an NRF. Each NF that requires a service should ask the NRF about the NF that offers that service (see 3GPP TS 23.502, clause 5.2.7.2).

FIG. 4 shows the registration of an NF (provided by an NF service provider 500) with an NRF 502. In the context of the present disclosure, the NF which is provided by the NF service provider 500 is a charging function (CHF).

In step 504, the NF service provider 500 transmits a registration request message to the NRF 502. The registration request message may comprise an indication of the type of NF, an identifier for the NF, an indication of the services offered by the NF, and addressing information for the CHF. Additional data may also be provided, such as e.g. range(s) of SUPIs, Data Set Identifier(s), etc. These indications may collectively be known as the NF profile.

According to embodiments of the disclosure, the registration request message additionally comprises an indication of one or more charging behaviours supported by the CHF. The indication may comprise one or more behaviour indexes associated with respective sets of charging characteristics. Alternatively, the indication may comprise a charging profile identifier, which is associated with one or more sets of charging characteristics.

The NRF 502 stores this information and, in step 506, transmits a message to the NF service provider 500 confirming that a profile has been established in the repository for the CHF.

This process is repeated multiple times in steps 300 and 302 (illustrated in FIG. 2), such that the NRF receives registration request messages from a plurality of CHF providers, and registers a plurality of CHFs in the repository. Each CHF registration or profile comprises an indication of one or more sets of charging characteristics or charging behaviours, together with addressing information enabling the CHF to be reached.

In step 304, the NRF receives a discovery request message from a requesting network node, as part of a procedure to establish a packet data connection for a UE. The requesting network node may be an SMF or a PCF, for example (see step 7b above).

The discovery request message comprises one or more search parameters for identifying a CHF to be used for the packet data connection, including at least an indication of a set of charging characteristics to be applied for the packet data connection. Note that the set of charging characteristics to be used for the packet data connection will have previously been acquired by the requesting network node from the UDM 112 (see step 4 of FIG. 1, described above). The indication of the set of charging characteristics in the discovery request message may comprise a behaviour index associated with the set of charging characteristics, or a charging profile identifier acquired from the set of charging characteristics itself.

The one or more search parameters in the discovery request message may additionally comprise one or more of: an indication of the requested NF type (e.g., CHF); an indication of the consuming NF type (e.g., SMF, PCF, etc.); SUPI; and data set identifiers.

In step 306, the NRF identifies one or more CHFs in the repository which support the indicated set of charging characteristics (based on the information stored during the registration process in steps 300 and 302). For example, the NRF may identify a primary CHF and a secondary CHF which support the indicated set of charging characteristics. In step 308 the NRF transmits a discovery response message to the requesting network node comprising addressing information to reach the identified CHF(s). The addressing information may comprise information of any suitable type or in any suitable format. For example, the addressing information may comprise one or more of: a fully qualified domain name (FQDN); an IPv4 address; and an IPv6 address). The addressing information is subsequently used by the requesting network node to reach the identified CHF(s) and to charge for the packet data connection established for the UE.

In alternative embodiments, the NRF may include in the discovery response message a list of multiple CHFs and corresponding charging profile IDs or behaviour indexes supported by those CHFs. In this case, the requesting network node selects the CHF instances from those listed in the discovery response message based on the required charging behaviour or charging profile ID.

Figure 5:
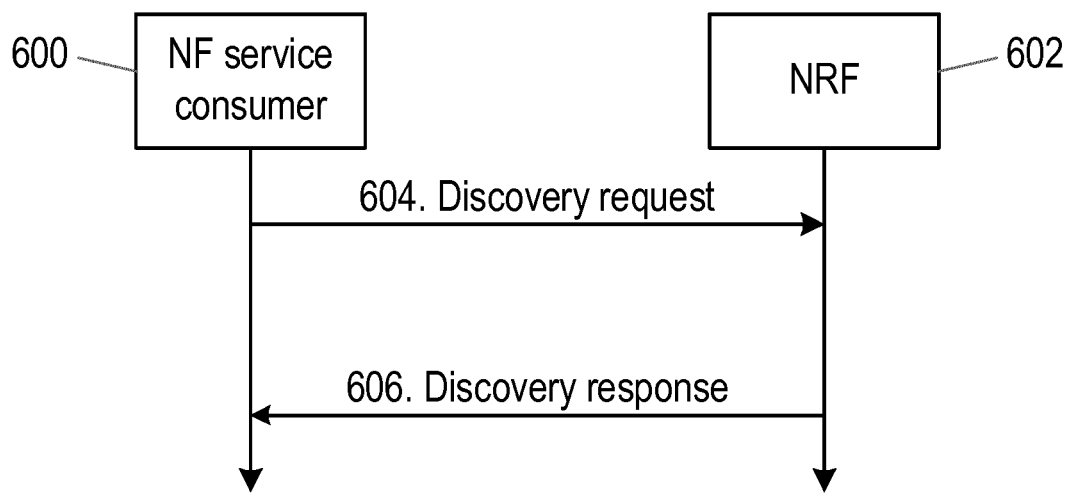
FIG. 5 is a signalling diagram showing a process of network function discovery according to embodiments of the disclosure.

The signaling of steps 304 to 308 is shown in FIG. 5, which is a signalling diagram showing a process of network function discovery according to embodiments of the disclosure.

FIG. 5 shows the discovery of a network function (NF) by a NF service consumer 600, in communication with an NRF 602. In the present context, the NF to be discovered is a CHF, and the NF service consumer 600 is the requesting network node referred to above. The requesting network node may be an SMF (e.g., where the CHF is discovered as part of a procedure to establish a packet data connection for a UE) or a PCF (e.g., where the CHF is discovered as part of a procedure to invoke a spending limit control service).

In step 604, the NF service consumer 600 transmits a discovery request message to the NRF 602. The discovery request message may comprise one or more search parameters such as: the service name(s), NF type of the target NF, NF type of the service consumer and some additional optional input information (S-NSSAI(s), target PLMN ID, Serving PLMN ID, NF service consumer ID, SUPI, data set identifier(s), etc.). According to embodiments of the disclosure, the discovery request message may additionally comprise an indication of a set of charging characteristics to be applied for the packet data connection.

With this information, the NRF 602 is able to identify addressing information of a CHF which supports the requested set of charging characteristics. This addressing information is provided in a discovery response message transmitted by the NRF 602 to the NF service consumer 600 in step 606. Additionally, the discovery response message may comprise further information (e.g. range of SUPIs, IPv4 address or IPv6 prefix, and data set identifiers, when the target NF stores data).

Those skilled in the art will appreciate that steps 300 and 302 may be performed at a different time and as part of a different procedure to steps 304 to 308. Steps 300 and 302 relate to registration of CHFs with the NRF, whereas steps 304 to 308 relate to selection of one or more CHFs for use in charging for a UE packet data connection. For example, steps 304 to 308 may be performed as part of step 7b in FIG. 1, whereas steps 300 and 302 will typically have been performed prior to the establishment of the packet data connection for the UE, as part of a different procedure.

Figure 3:
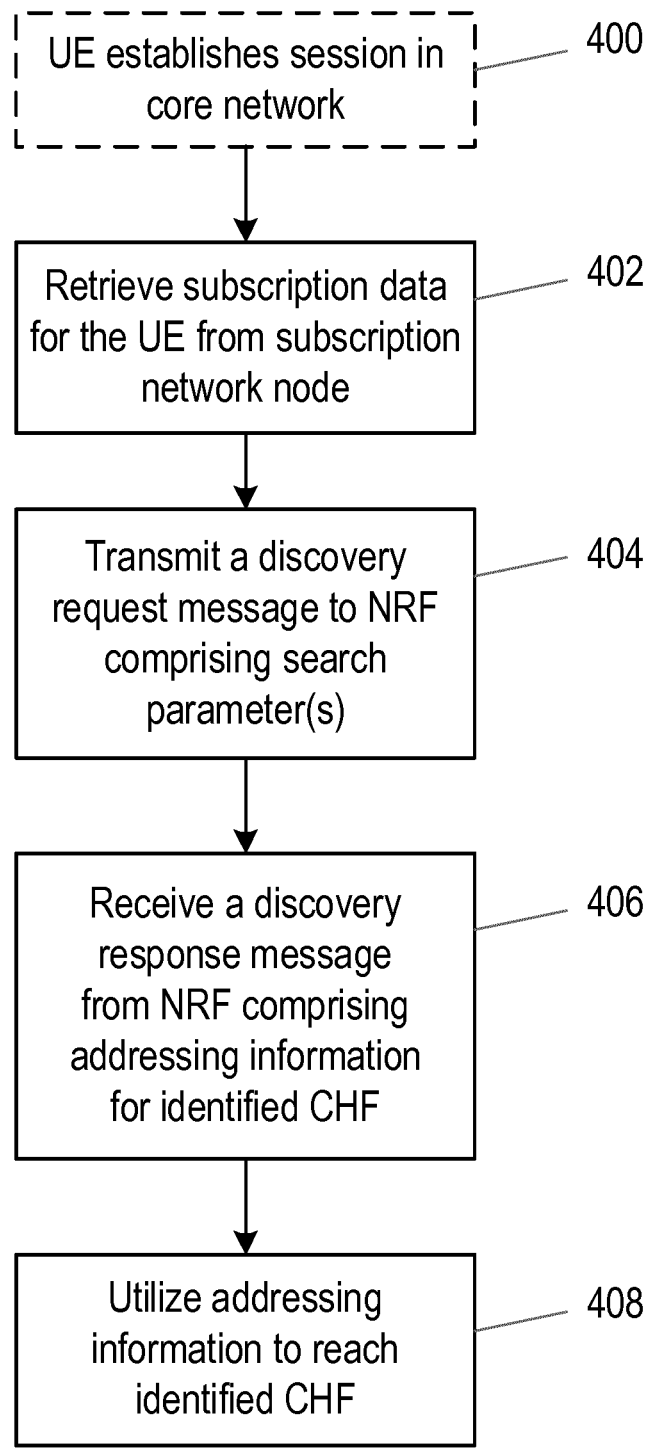
FIG. 3 is a flowchart of a method in a network node implementing a network function according to embodiments of the disclosure.

FIG. 3 is a flowchart of a method in a network node implementing a network function according to embodiments of the disclosure. The network node may correspond to the requesting network node described above with respect to FIG. 2. For example, the network node may implement an SMF or a PCF.

The method may be implemented upon or as part of a procedure to establish a packet data connection for a UE. Thus, in box 400 the UE establishes a packet data session (e.g., a PDU session) in a core network of a wireless communication network.

In step 402, the network node retrieves subscription data for the UE from a subscription network node (e.g., a UDM). The subscription data includes an indication of a set of charging characteristics to be applied for the packet data connection or session for the UE. The indication of a set of charging characteristics may comprise a behaviour index associated with the set of charging characteristics, for example. This step may correspond to step 4, described above with respect to FIG. 1.

In step 404, the network node transmits a discovery request message to an NRF. The discovery request message comprises one or more search parameters for identifying a CHF to be used for the packet data connection or session, including at least an indication of the set of charging characteristics to be applied for the packet data connection or session (i.e. that set of charging characteristics obtained in step 402). The indication of the set of charging characteristics in the discovery request message may comprise a behaviour index associated with the set of charging characteristics, or a charging profile identifier acquired from the set of charging characteristics itself.

The one or more search parameters in the discovery request message may additionally comprise one or more of: an indication of the requested NF type (e.g., CHF); an indication of the consuming NF type (e.g., SMF, PCF, etc.); SUPI; and data set identifiers.

In step 406, the network node receives a discovery response message from the NRF, comprising addressing information to reach one or more CHFs which support the indicated set of charging characteristics. For example, the discovery response message may comprise addressing information to reach a primary CHF and a secondary CHF which support the indicated set of charging characteristics. The addressing information may comprise information of any suitable type or in any suitable format. For example, the addressing information may comprise one or more of: an FQDN; an IPv4 address; and an IPv6 address).

In step 408, the network node uses the addressing information to reach the CHF and charge for the packet data connection or session established for the UE.

In alternative embodiments, the NRF may include in the discovery response message a list of multiple CHFs and corresponding charging profile IDs or behaviour indexes supported by those CHFs. In this case, the requesting network node selects the CHF instances from those listed in the discovery response message based on the required charging behaviour or charging profile ID.

Figure 6:
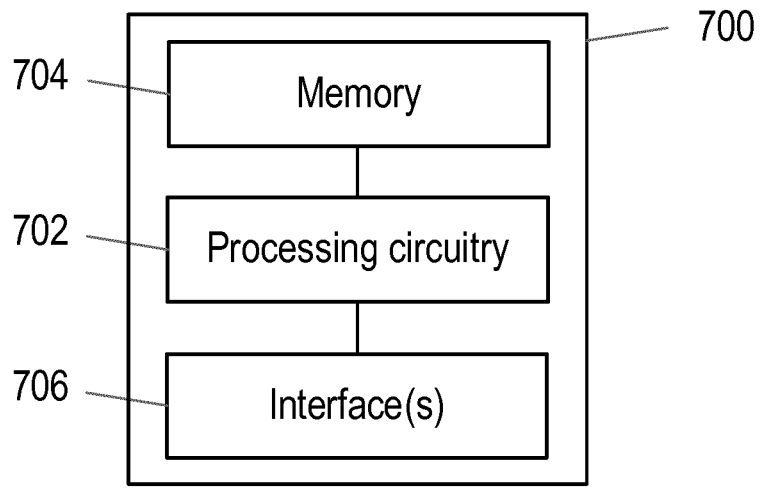
FIGS. 6 and 7 are schematic diagrams of network nodes implementing a network function repository function according to embodiments of the disclosure.

FIG. 6 is a schematic diagram of a network node 700 implementing a network function repository function according to embodiments of the disclosure. The network node 700 may be configured to implement or perform the method described above with respect to FIG. 2, and/or the signaling of the NRF node shown in FIGS. 4 and 5.

The network function repository function has access to a repository of network functions. The network node 700 comprises processing circuitry 702, a non-transitory device-readable medium (such as memory) 704 and one or more interfaces 706. According to embodiments of the disclosure, the processing circuitry 702 is configured to: receive, from each CHF amongst a plurality of CHFs, a registration request message to register the CHF in the repository of network functions, the registration request message comprising an indication of one or more sets of charging characteristics supported by the CHF and addressing information to reach the CHF; register each CHF in the repository of network functions, the registration associating the indication of one or more sets of charging characteristics supported by the CHF with the addressing information to reach the CHF; receive, from a requesting network node, a discovery request message comprising one or more search parameters for identifying a CHF to be used for a packet data connection or session for a user equipment, the one or more search parameters including at least an indication of a set of charging characteristics to be applied for the packet data connection or session; identify, from the repository of network functions and based on the one or more search parameters, a CHF that supports the indicated set of charging characteristics; and transmit, to the requesting network node, a discovery response message comprising the addressing information to reach the identified CHF.

Figure 7:
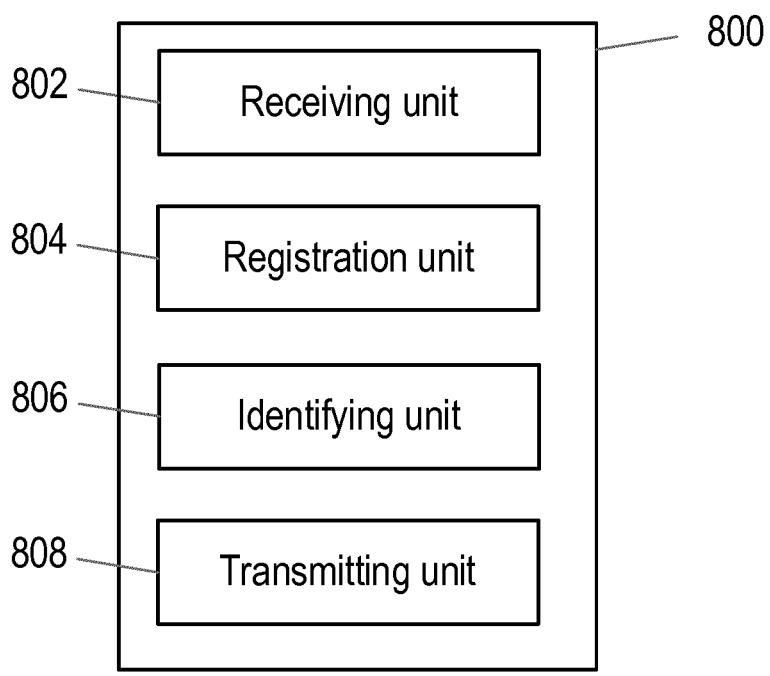

FIG. 7 is a schematic diagram of a network node 800 implementing a network function repository function according to embodiments of the disclosure. The network node 800 may be configured to implement or perform the method described above with respect to FIG. 2, and/or the signaling of the NRF node shown in FIGS. 4 and 5.

The network function repository function has access to a repository of network functions. The network node 800 comprises a receiving unit 802, a registration unit 804, an identifying unit 806 and a transmitting unit 808. According to embodiments of the disclosure, the receiving unit 802 is configured to receive, from each CHF amongst a plurality of CHFs, a registration request message to register the CHF in the repository of network functions. The registration request message comprises an indication of one or more sets of charging characteristics supported by the CHF and addressing information to reach the CHF. The registration unit 804 is configured to register each CHF in the repository of network functions. The registration associates the indication of one or more sets of charging characteristics supported by the CHF with the addressing information to reach the CHF. The receiving unit 802 is further configured to receive, from a requesting network node, a discovery request message comprising one or more search parameters for identifying a CHF to be used for a packet data connection or session for a user equipment. The one or more search parameters include at least an indication of a set of charging characteristics to be applied for the packet data connection or session. The identifying unit 806 is configured to identify, from the repository of network functions and based on the one or more search parameters, a CHF that supports the indicated set of charging characteristics. The transmitting unit 808 is configured to transmit, to the requesting network node, a discovery response message comprising the addressing information to reach the identified CHF.

Figure 8:
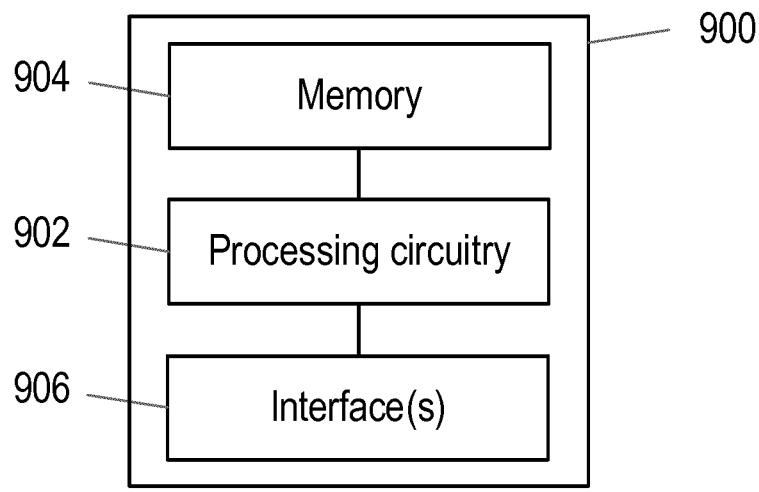
FIGS. 8 and 9 are schematic diagrams of network nodes implementing a network function according to embodiments of the disclosure.

FIG. 8 is a schematic diagram of a network node 900 implementing a network function according to embodiments of the disclosure. The network node 900 may be configured to implement or perform the method described above with respect to FIG. 3, and/or the signaling of the NF service consumer 600 shown in FIG. 5.

The network node 900 comprises processing circuitry 902, a non-transitory device-readable medium (such as memory) 904 and one or more interfaces 906. According to embodiments of the disclosure, the processing circuitry 902 is configured to: upon a user equipment, UE, establishing a packet data connection or session in the core network, retrieve, from a subscription network node, subscription data for the UE including an indication of a set of charging characteristics to be applied for the packet data connection or session for the UE; transmit, to a network node implementing a network function repository function, a discovery request message comprising one or more search parameters for identifying a charging function, CHF, the one or more search parameters including at least an indication of the set of charging characteristics to be applied for the packet data connection or session; receive, from the network node implementing the network function repository function, a discovery response message comprising addressing information to reach the identified CHF; and utilize the addressing information to reach the identified CHF for the packet data connection or session for the UE.

Figure 9:
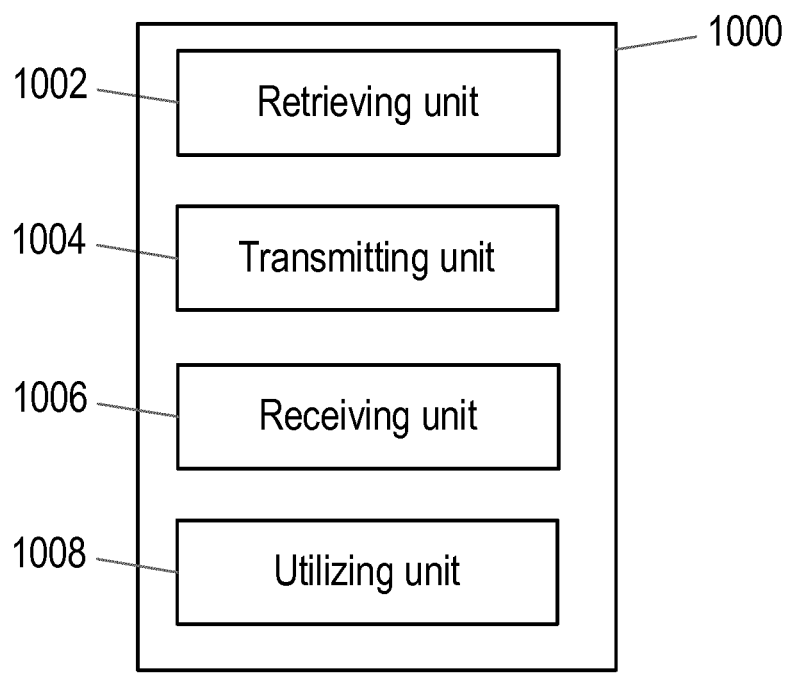

FIG. 9 is a schematic diagram of a network node 1000 implementing a network function according to embodiments of the disclosure. The network node 1000 may be configured to implement or perform the method described above with respect to FIG. 3, and/or the signaling of the NF service consumer 600 shown in FIG. 5.

The network node 1000 comprises a retrieving unit 1002, a transmitting unit 1004, a receiving unit 1006 and a utilizing unit 1008. According to embodiments of the disclosure, the retrieving unit 1002 is configured to retrieve, upon a UE establishing a packet data connection or session in the core network, from a subscription network node, subscription data for the UE including an indication of a set of charging characteristics to be applied for the packet data connection or session for the UE. The transmitting unit 1004 is configured to transmit, to a network node implementing a network function repository function, a discovery request message comprising one or more search parameters for identifying a CHF. The one or more search parameters include at least an indication of the set of charging characteristics to be applied for the packet data connection or session. The receiving unit 1006 is configured to receive, from the network node implementing the network function repository function, a discovery response message comprising addressing information to reach the identified CHF. The utilizing unit 1008 is configured to utilize the addressing information to reach the identified CHF for the packet data connection or session for the UE.

In both embodiments described above with respect to FIGS. 6 and 8, the processing circuitry 702, 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other components, such as device readable medium 704, 904, the network nodes 700, 900 with functionality. For example, processing circuitry 702, 902 may execute instructions stored in device readable medium 704, 904 or in memory within processing circuitry 702, 902. In some embodiments, processing circuitry 702, 902 may include a system on a chip (SOC). In some embodiments, processing circuitry 702, 902 may include radio frequency (RF) transceiver circuitry and baseband processing circuitry.

In certain embodiments, some or all of the functionality described herein as being provided by a network node may be performed by processing circuitry 702, 902 executing instructions stored on device readable medium 704, 904 or memory within processing circuitry 702, 902. In alternative embodiments, some or all of the functionality may be provided by processing circuitry 702, 902 without executing instructions stored on a separate or discrete device readable medium, such as in a hard-wired manner. In any of those embodiments, whether executing instructions stored on a device readable storage medium or not, processing circuitry 702, 902 can be configured to perform the described functionality. The benefits provided by such functionality are not limited to processing circuitry 702, 902 alone or to other components of the network nodes 700, 900, but are enjoyed by the network nodes 700, 900 as a whole, and/or by end users and the network generally.

Device readable medium 704, 904 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 702, 902. Device readable medium 704, 904 may store any suitable instructions, data or information, including a computer program, software, an application including one or more of logic, rules, code, tables, etc. and/or other instructions capable of being executed by processing circuitry 702, 902 and utilized by the network nodes 700, 900. Device readable medium 704, 904 may be used to store any calculations made by processing circuitry 702, 902 and/or any data received via interface 706, 906. In some embodiments, processing circuitry 702, 902 and device readable medium 704, 904 may be considered to be integrated.

Interface(s) 706, 906 may be used in the communication of signalling and/or data between the network nodes 700, 900 themselves, and also between the network nodes 700, 900 and one or more further network nodes or functions. The interface(s) 706, 906 may comprise any suitable hardware and/or software for the transmission of data using any medium, such as wireless, wired, or optical mediums.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method performed by a network node implementing a network function repository function in a core network, the network function repository function having access to a repository of network functions, the method comprising:

receiving, from each charging function, CHF, amongst a plurality of CHFs, a registration request message to register the CHF in the repository of network functions, the registration request message comprising an indication of one or more sets of charging characteristics supported by the CHF and addressing information to reach the CHF;

registering each CHF in the repository of network functions, the registration associating the indication of one or more sets of charging characteristics supported by the CHF with the addressing information to reach the CHF;

receiving, from a requesting network node, a discovery request message comprising one or more search parameters for identifying a CHF to be used for a packet data connection for a user equipment, the one or more search parameters including at least an indication of a set of charging characteristics to be applied for the packet data connection;

identifying, from the repository of network functions and based on the one or more search parameters, a CHF that supports the indicated set of charging characteristics; and transmitting, to the requesting network node, a discovery response message comprising the addressing information to reach the identified CHF.

2. The method according to claim 1, wherein the indication of a set of charging characteristics comprises a charging behaviour index associated with the set of charging characteristics.

3. The method according to claim 1, wherein the indication of a set of charging characteristics comprises a charging profile identifier identifying a plurality of charging behaviour indexes associated with a corresponding plurality of sets of charging characteristics.

4. The method according to claim 2, wherein each set of charging characteristics excludes addressing information to reach a CHF.

5. The method according to claim 1, wherein each set of charging characteristics comprises one or more of: an indication as to whether the charging is online or offline; a time limit per protocol data unit session; and a volume limit per protocol data unit session.

6. The method according to claim 1, wherein the requesting network node implements one of a session management function and a policy control function.

7. The method according to claim 1, wherein the discovery response message comprises the addressing information for more than one CHF.

8. A method performed by a network node implementing a network function in a core network, the method comprising:

upon a user equipment, UE, establishing a packet data connection in the core network, retrieving, from a subscription network node, subscription data for the UE including an indication of a set of charging characteristics to be used for the packet data connection for the UE;

transmitting, to a network node implementing a network function repository function, a discovery request message comprising one or more search parameters for identifying a charging function, CHF, the one or more search parameters including at least an indication of the set of charging characteristics to be applied for the packet data connection;

receiving, from the network node implementing the network function repository function, a discovery response message comprising addressing information to reach the identified CHF; and utilizing the addressing information to reach the identified CHF for the packet data connection for the UE.

9. The method according to claim 8, wherein the indication of a set of charging characteristics comprises a charging behaviour index associated with the set of charging characteristics.

10. The method according to claim 8, wherein the indication of a set of charging characteristics comprises a charging profile identifier identifying a plurality of charging behaviour indexes associated with a corresponding plurality of sets of charging characteristics.

11. The method according to claim 9, wherein each set of charging characteristics excludes addressing information to reach a CHF.

12. The method according to claim 8, wherein each set of charging characteristics comprises one or more of: an indication as to whether the charging is online or offline; a time limit per protocol data unit session; and a volume limit per protocol data unit session.

13. The method according to claim 8, wherein the network node implements one of a session management function and a policy control function.

14. The method according to claim 8, wherein the subscription network node implements one of a user data management function, a unified data management, a unified data repository, a user data repository and a subscription profile repository.

15. The method according to claim 8, wherein the discovery response message comprises the addressing information for more than one CHF.

16. A network node implementing a network function repository function in a core network, the network function repository function having access to a repository of network functions, the network node comprising processing circuitry and a non-transitory machine-readable medium storing instructions which, when executed by the processing circuitry, cause the network node to:
receive, from each charging function, CHF, amongst a plurality of CHFs, a registration request message to register the CHF in the repository of network functions, the registration request message comprising an indication of one or more sets of charging characteristics supported by the CHF and addressing information to reach the CHF;
register each CHF in the repository of network functions, the registration associating the indication of one or more sets of charging characteristics supported by the CHF with the addressing information to reach the CHF;
receive, from a requesting network node, a discovery request message comprising one or more search parameters for identifying a CHF to be used for a packet data connection for a user equipment, the one or more search parameters including at least an indication of a set of charging characteristics to be applied for the packet data connection;
identify, from the repository of network functions and based on the one or more search parameters, a CHF that supports the indicated set of charging characteristics; and
transmit, to the requesting network node, a discovery response message comprising the addressing information to reach the identified CHF.

17. The network node according to claim 16, wherein the indication of a set of charging characteristics comprises a charging behaviour index associated with the set of charging characteristics.

18. The network node according to claim 16, wherein each set of charging characteristics comprises one or more of: an indication as to whether the charging is online or offline; a time limit per protocol data unit session; and a volume limit per protocol data unit session.

19. The network node according to claim 16, wherein the discovery response message comprises the addressing information for more than one CHF.

20. A network node implementing a network function in a core network, the network node comprising processing circuitry and a non-transitory machine-readable medium storing instructions which, when executed by the processing circuitry, cause the network node to:
upon a user equipment, UE, establishing a packet data connection in the core network, retrieve, from a subscription network node, subscription data for the UE including an indication of a set of charging characteristics to be applied for the packet data connection for the UE;
transmit, to a network node implementing a network function repository function, a discovery request message comprising one or more search parameters for identifying a charging function, CHF, the one or more search parameters including at least an indication of the set of charging characteristics to be applied for the packet data connection;
receive, from the network node implementing the network function repository function, a discovery response message comprising addressing information to reach the identified CHF; and
utilize the addressing information to reach the identified CHF for the packet data connection for the UE.

21. The network node according to claim 20, wherein the indication of a set of charging characteristics comprises a charging behaviour index associated with the set of charging characteristics.

22. The network node according to claim 20, wherein the indication of a set of charging characteristics comprises a charging profile identifier identifying a plurality of charging behaviour indexes associated with a corresponding plurality of sets of charging characteristics.

23. The network node according to claim 20, wherein each set of charging characteristics comprises one or more of: an indication as to whether the charging is online or offline; a time limit per protocol data unit session; and a volume limit per protocol data unit session.

24. The network node according to claim 20, wherein the discovery response message comprises the addressing information for more than one CHF.

* * * * *